(12) United States Patent
Inoue et al.

(10) Patent No.: US 12,365,783 B2
(45) Date of Patent: Jul. 22, 2025

(54) COMPOUND, MOLDED ARTICLE, AND CURED PRODUCT

(71) Applicant: Showa Denko Materials Co., Ltd., Tokyo (JP)

(72) Inventors: Hidetoshi Inoue, Tokyo (JP); Yuta Ono, Tokyo (JP); Yoshinori Endo, Tokyo (JP)

(73) Assignee: Resonac Corporation, Tokyo (JP)

( * ) Notice: Subject to any disclaimer, the term of this patent is extended or adjusted under 35 U.S.C. 154(b) by 785 days.

(21) Appl. No.: 17/613,493

(22) PCT Filed: May 20, 2020

(86) PCT No.: PCT/JP2020/019981
§ 371 (c)(1),
(2) Date: Nov. 23, 2021

(87) PCT Pub. No.: WO2020/246246
PCT Pub. Date: Dec. 10, 2020

(65) Prior Publication Data
US 2022/0243034 A1    Aug. 4, 2022

(30) Foreign Application Priority Data

Jun. 4, 2019 (JP) ................................ 2019-104677

(51) Int. Cl.
| | | |
|---|---|---|
| C08L 91/06 | (2006.01) | |
| B29C 45/02 | (2006.01) | |
| C08K 3/08 | (2006.01) | |
| C08K 5/098 | (2006.01) | |
| C08L 63/00 | (2006.01) | |
| B29K 63/00 | (2006.01) | |
| B29K 105/06 | (2006.01) | |

(52) U.S. Cl.
CPC ................ C08K 3/08 (2013.01); B29C 45/02 (2013.01); C08K 5/098 (2013.01); C08L 63/00 (2013.01); *B29K 2063/00* (2013.01); *B29K 2105/06* (2013.01)

(58) Field of Classification Search
CPC ........... C08K 3/08; C08K 5/098; C08L 63/00; C08L 91/06; B22F 1/08; B22F 2998/10; C22C 33/02

See application file for complete search history.

(56) References Cited

U.S. PATENT DOCUMENTS

| | | | | |
|---|---|---|---|---|
| 4,776,980 A | * | 10/1988 | Ruffini | ...................... H01F 1/26 524/440 |
| 2006/0291215 A1 | * | 12/2006 | Shirai | .................. G02B 5/0866 362/341 |
| 2009/0267855 A1 | * | 10/2009 | Maruko | ................... C21D 8/12 343/788 |
| 2012/0119134 A1 | * | 5/2012 | Muramatsu | ............... H01F 1/26 419/10 |
| 2017/0110231 A1 | * | 4/2017 | Matsutomi | .......... H01F 1/14791 |
| 2018/0298186 A1 | * | 10/2018 | Yoshihara | ............... C08L 67/02 |

FOREIGN PATENT DOCUMENTS

| | | |
|---|---|---|
| CN | 103666364 | 3/2014 |
| CN | 105637008 | 6/2016 |
| CN | 106165028 | 11/2016 |
| CN | 107808729 | 3/2018 |
| CN | 108057878 | 5/2018 |
| EP | 3293740 | 3/2018 |
| EP | 3719050 | 10/2020 |
| EP | 3805319 | 4/2021 |
| JP | S58122705 | 7/1983 |
| JP | 660220908 | 11/1985 |
| JP | H03140322 | 6/1991 |
| JP | H05234728 | 9/1993 |
| JP | H07309998 | 11/1995 |
| JP | 10982511 | 3/1997 |
| JP | 2002260909 | 9/2002 |
| JP | 2014013803 | 1/2014 |
| JP | 2018041872 | 3/2018 |
| JP | 2019048948 | 3/2019 |
| JP | 2019080058 | 5/2019 |
| KR | 1020100014372 | 2/2010 |
| TW | 201905103 | 2/2019 |
| WO | 2019004458 | 1/2019 |
| WO | 2019054217 | 3/2019 |
| WO | 2019106813 | 6/2019 |
| WO | 2019229960 | 12/2019 |
| WO | 2019229961 | 12/2019 |

OTHER PUBLICATIONS

Licowax OP powder datasheet (Year: 2014).*
"Database WPI Week 201840, Thomson Scientific, London, GB; AN2018-41814Q", -, XP002806704, May 22, 2018.

* cited by examiner

*Primary Examiner* — Mark S Kaucher
(74) *Attorney, Agent, or Firm* — JCIPRNET

(57) ABSTRACT

A compound includes metal powder, an epoxy resin, and a wax. The content of the metal powder is from 96 mass % to less than 100 mass %. The wax includes at least one selected from the group consisting of metal salts of lauric acid, metal salts of stearic acid, and saponified montanic acid esters.

19 Claims, 4 Drawing Sheets ly reduced. In particular, in a case where the height (depth) of the flow path of the compound is 1 mm or less, it is difficult for a compound having a large content of metal powder to flow. Further, in a case where the content of metal powder in the compound is 96 mass % or more, it is difficult for the compound to fill the inside of the mold. For example, in a case where fine cavities are formed in the mold on a scale of millimeters or less, it is difficult to uniformly fill the cavities with a compound having a large content of metal powder. As electronic equipment has become smaller in recent years, the dimensions of devices mounted in electronic equipment have become smaller. Therefore, in a case where a compound is used to manufacture devices, it is necessary that the compound flows in a narrow flow path and that fine cavities are uniformly filled with the compound that has passed through the narrow flow path.

COMPOUND, MOLDED ARTICLE, AND CURED PRODUCT

CROSS-REFERENCE TO RELATED APPLICATION

This application is a 371 application of the International PCT application serial no. PCT/JP2020/019981, filed on May 20, 2020, which claims the priority benefit of Japan Patent Application No. 2019-104677, filed on Jun. 4, 2019. The entirety of each of the above-mentioned patent applications is hereby incorporated by reference herein and made a part of this specification.

TECHNICAL FIELD

The present invention relates to a compound, a molded article, and a cured product.

RELATED ART

A compound containing metal powder and a thermosetting resin is used as a raw material for a variety of industrial products, such as inductors, electromagnetic shields, and bonded magnets, depending on various physical properties of the metal powder (refer to Patent Literature 1 below).

CITATION LIST

Patent Literature

Patent Literature 1: Japanese Patent Laid-Open No. 2014-13803

SUMMARY OF INVENTION

Technical Problem

In a case of manufacturing industrial products from a compound, the compound is supplied and is filled into the inside of a mold through a flow path, or a component such as a coil is embedded in the compound in the mold. Flowability of the compound is required in these processes. However, in a case where the content of metal powder in the compound is 96 mass % or more, the flowability of the compound is significant An objective of the present invention is to provide a compound having excellent flowability and fillability, a molded article containing the compound, and a cured product of the compound.

Solution to Problem

According to an aspect of the present invention, there is provided a compound in which metal powder, an epoxy resin, and a wax are contained, a content of the metal powder is 96 mass % or more and less than 100 mass %, and the wax contains at least one selected from a group consisting of metal salts of lauric acid, metal salts of stearic acid, and saponified montanic acid esters.

The wax may contain metal salts of lauric acid and saponified montanic acid esters.

At least one selected from the group consisting of the metal salts of lauric acid, the metal salts of stearic acid, and the saponified montanic acid esters may contain zinc.

At least one selected from the group consisting of the metal salts of lauric acid, the metal salts of stearic acid, and the saponified montanic acid esters may contain at least one selected from a group consisting of alkali metal elements and alkaline earth metal elements.

The saponified montanic acid esters may contain calcium.

The saponified montanic acid esters may be partially saponified montanic acid esters.

The saponification value of the partially saponified montanic acid esters may be 102 mg KOH/g or more and 122 mg KOH/g or less.

The compound may be used for transfer molding.

According to another aspect of the present invention, there is provided a molded article including the above-described compound.

According to still another aspect of the present invention, there is provided a cured product of the above-described compound.

Effects of Invention

According to the present invention, a compound having excellent flowability and fillability, a molded article containing the compound, and a cured product of the compound can be provided.

Figure 2:
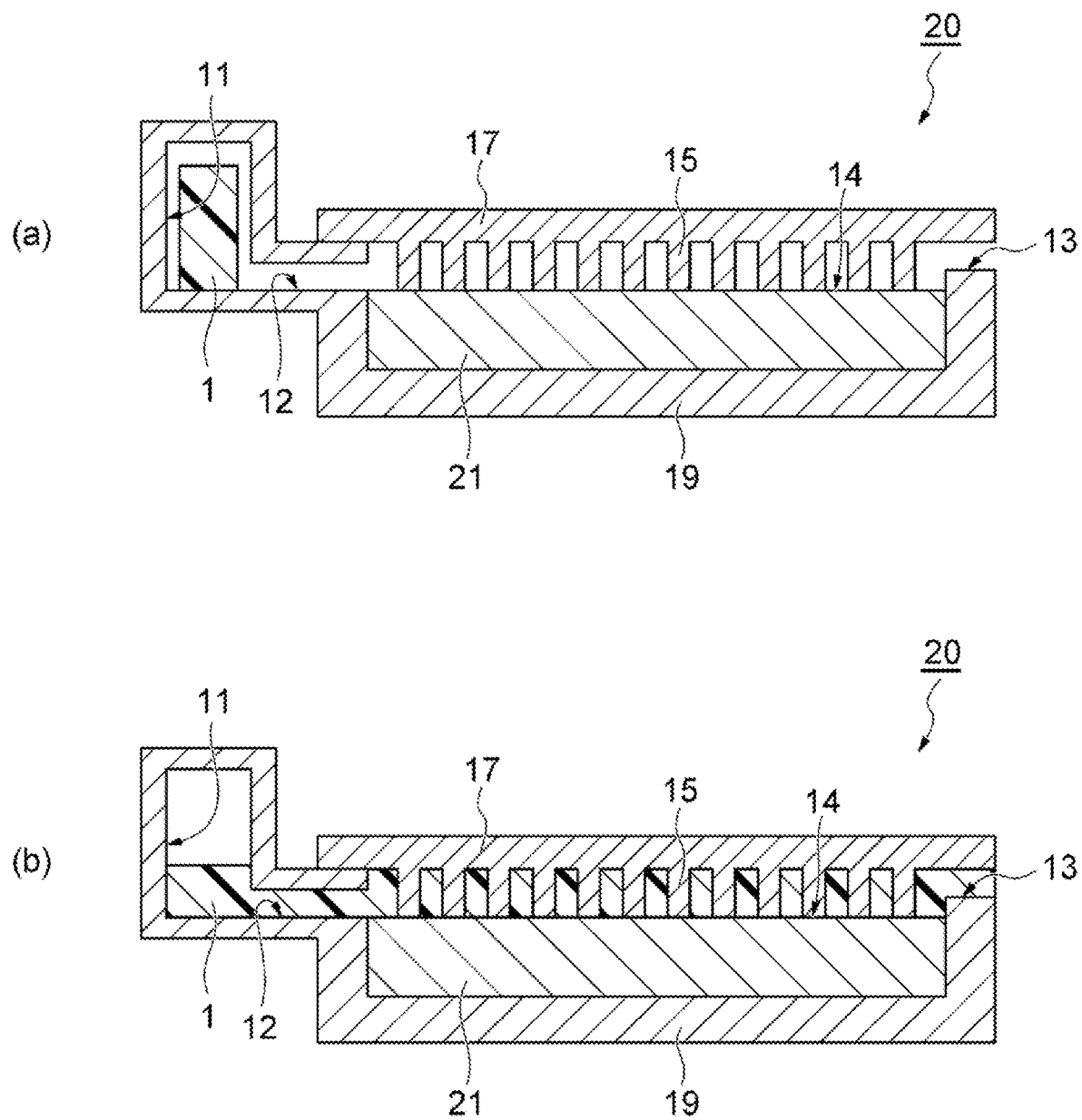

(a) of FIG. 2 and (b) of FIG. 2 are schematic sectional views of a metal mold for evaluating the fillability of the compound.

Figure 3:
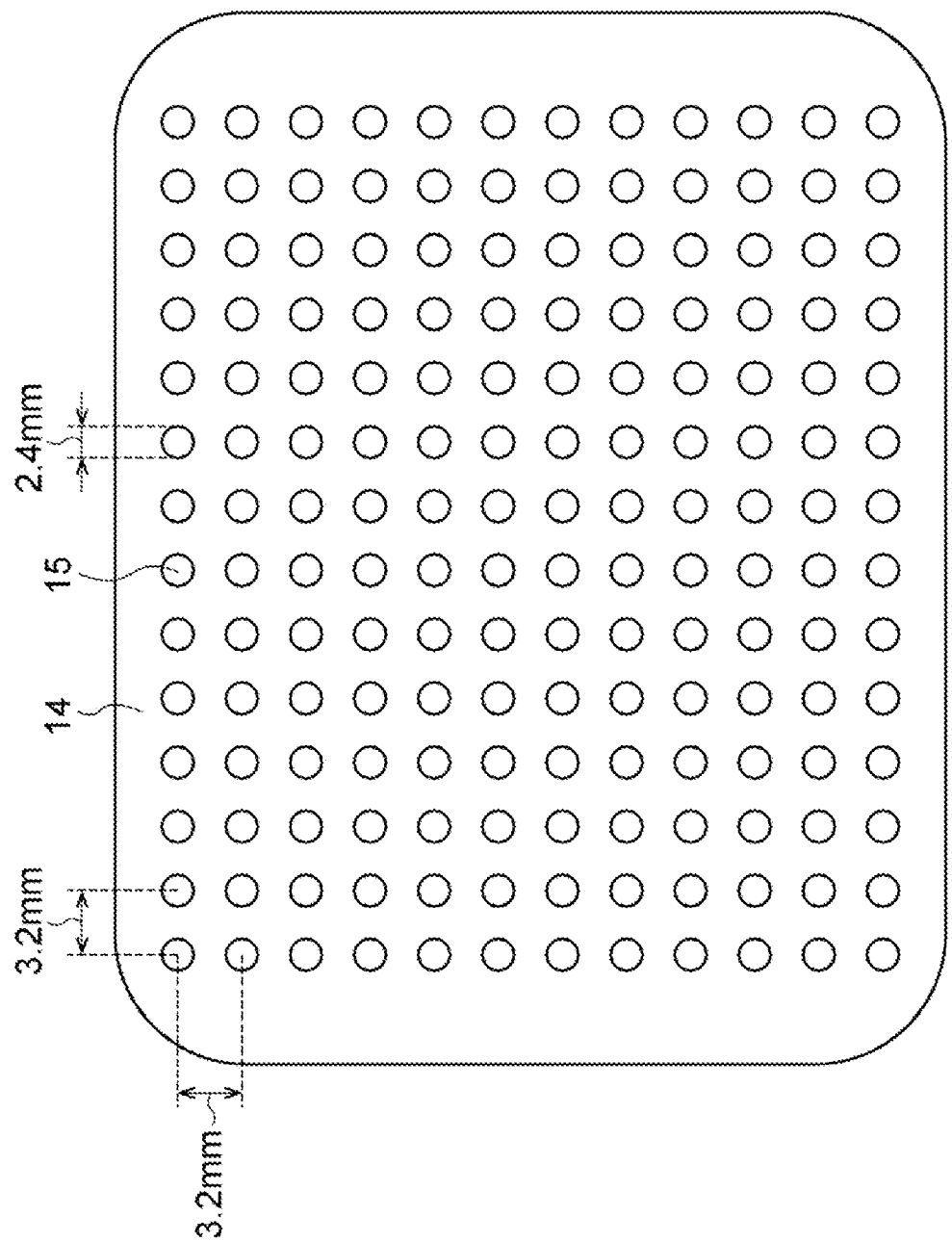

FIG. 3 is a schematic view of an upper surface of the metal mold shown in (a) of FIG. 2 and (b) of FIG. 2.

Figure 4:
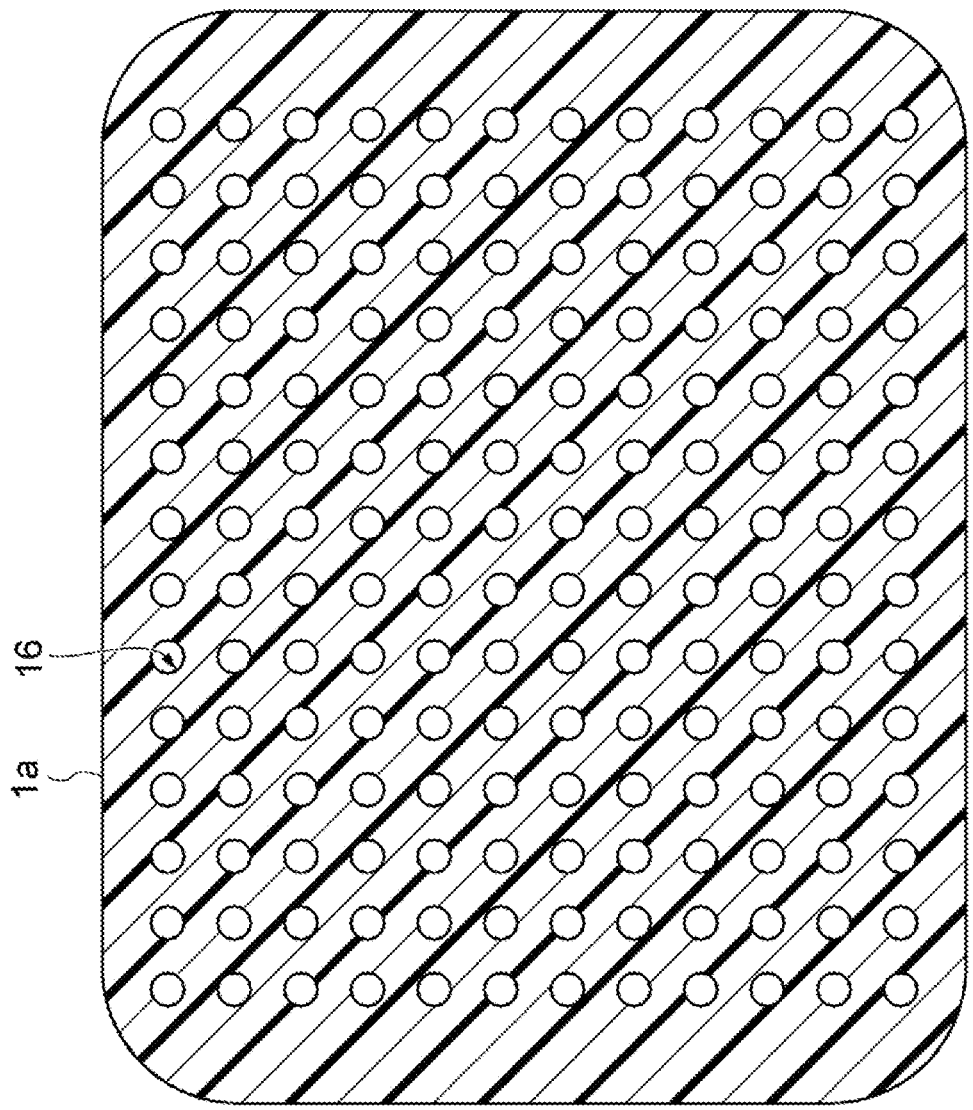

FIG. 4 is a schematic view of an upper surface of a molded article formed by using the metal mold shown in (a) of FIG. 2, (b) of FIG. 2, and FIG. 3.

DESCRIPTION OF EMBODIMENTS

Hereinafter, a suitable embodiment of the present invention will be described. However, the present invention is not limited to the following embodiments in any manner.

<Outline of Compound>

A compound according to the present embodiment contains at least metal powder, an epoxy resin, and a wax. The metal powder consists of multiple (many) metal particles. The metal powder may contain, for example, at least one selected from a group consisting of elemental metals, alloys, amorphous powders, and metallic chemical compounds. In addition to the metal powder, epoxy resin, and wax, the compound may further contain other components. For example, the compound may further contain a curing agent. The compound may further contain a curing accelerator. The compound may further contain an additive. The additive may be, for example, a coupling agent or a flame retardant. The "resin composition" described below is a component that contains an epoxy resin and a wax. The resin composition is a component that can contain an epoxy resin, a wax, a curing agent, a curing accelerator, and an additive, and may be the remaining components (non-volatile components) excluding the metal powder and the organic solvent.

The resin composition may be attached to the surface of each metal particle constituting the metal powder. The resin composition may cover a part of the surface of each metal particle or may cover the entire surface of the particle. The compound may contain metal powder and an uncured resin composition. The compound may contain metal powder and a semi-cured product of a resin composition (for example, B-stage resin composition). The compound may contain both an uncured resin composition and a semi-cured product of a resin composition. The compound may be a powder. The compound may be a tablet. The compound may be a paste.

The wax contained in the compound contains at least one selected from the group consisting of metal salts of lauric acid, metal salts of stearic acid, and saponified montanic acid esters. Wax improves the flowability of the compound. In addition, wax functions as a mold release agent. The metal salts of lauric acid, the metal salts of stearic acid, and the saponified montanic acid esters may be metal soaps, respectively. The compound may contain only one type of wax selected from the group consisting of metal salts of lauric acid, metal salts of stearic acid, and saponified montanic acid esters. The compound may contain multiple types of waxes selected from the group consisting of metal salts of lauric acid, metal salts of stearic acid, and saponified montanic acid esters.

The content of the metal powder in the compound is 96 mass % or more and less than 100 mass %. The content of the metal powder in the compound is preferably 96 mass % or more and 99.8 mass % or less, 96 mass % or more and 99 mass % or less, 96 mass % or more and 98 mass % or less, or 96.1 mass % or more and 97.5 mass % or less. As the content of the metal powder increases, the filling ratio of the metal powder in the compound increases, and the relative permeability of the compound increases. Compounds having high relative permeability are suitable, for example, as encapsulants for inductors or as raw materials for the magnetic cores of inductors. However, in a case where the content of the metal powder in a compound that does not contain a wax is 96 mass % or more, the flowability of the compound is significantly reduced. Meanwhile, the compound according to the present embodiment contains, as the wax, at least one selected from the group consisting of metal salts of lauric acid, metal salts of stearic acid, and saponified montanic acid esters. As a result, even though the content of metal powder in the compound is 96 mass % or more, the flowability of the compound according to the present embodiment is superior to that of a conventional compound. For example, even in a case where the height (depth) of the flow path of the compound is 1 mm or less, the compound according to the present embodiment can easily flow. Even when the conventional compound contains a wax different from the above-described wax and the total content of the wax in the conventional compound is the same as the total content of the wax in the compound according to the present embodiment, the flowability of the conventional compound is significantly inferior to that of the compound according to the present embodiment.

In a case where the content of the metal powder in the compound that does not contain a wax is 96 mass % or more, it is difficult for the compound to fill the inside of a mold. Meanwhile, the compound according to the present embodiment contains, as the wax, at least one selected from the group consisting of metal salts of lauric acid, metal salts of stearic acid, and saponified montanic acid esters. As a result, even though the content of metal powder in the compound is 96 mass % or more, the fillability of the compound according to the present embodiment is superior to that of a conventional compound. For example, in a case where fine cavities are formed in the mold on a scale of millimeters or less, it is easy to uniformly fill the cavities with the compound according to the present embodiment. Even when the conventional compound contains a wax different from the above-described wax and the total content of the wax in the conventional compound is the same as the total content of the wax in the compound according to the present embodiment, the fillability of the conventional compound is significantly inferior to that of the compound according to the present embodiment.

The decrease in the flowability of the compound is caused by the friction between the metal powder and the resin composition and the friction between the metal particles constituting the metal powder. In addition, in a case where the content of the metal powder in the compound is 96 mass % or more, the friction between the metal particles becomes more significant. However, the metal salts of lauric acid, the metal salts of stearic acid, or the saponified montanic acid esters reduce the friction between the metal particles. The mechanism by which the friction between the metal particles is reduced is presumed to be as follows. Since the molecules of each of the metal salts of lauric acid, the metal salts of stearic acid, and the saponified montanic acid esters contain a metal, polarization is likely to occur in each molecule. In other words, the molecules of each of the metal salts of lauric acid, the metal salts of stearic acid, and the saponified montanic acid esters are likely to have polarity. Therefore, the metal salts of lauric acid, the metal salts of stearic acid, and the saponified montanic acid esters are more likely to be adsorbed or coordinated on the surface of the metal particles than other waxes. As a result, the friction between the metal particles is reduced. Further, the relatively long carbon chains of each of the metal salts of lauric acid, the metal salts of stearic acid, and the saponified montanic acid esters contribute to the flowability. For these reasons, the flowability of the compound is improved. As the flowability improves, the fillability also improves. However, the mechanism for improving the flowability and fillability of the compound is not limited to the above-described mechanism.

As described above, the compound according to the present embodiment is excellent in flowability and fillability. Therefore, the compound according to the present embodiment is likely to uniformly fill the inside of the fine cavities formed in a mold after flowing in a narrow flow path.

<Details of Composition of Compound>

(Wax)

The saponified montanic acid esters may be a partially saponified montanic acid esters. The partially saponified montanic acid esters may be represented by a mixture of montanic acid esters and metal salts of montanic acid. The partially saponified montanic acid esters may further contain an alcohol (for example, glycerin). Alcohol is generated by the saponification of montanic acid esters. The saponification of montanic acid esters can be represented by hydrolysis of montanic acid esters by an alkali. Saponified montanic acid esters (particularly, partially saponified montanic acid esters) are superior to unsaponified montanic acid esters in that the flowability and fillability of a compound in which the content of metal powder is 96 mass % or more are improved therewith. The saponification value of the partially saponified montanic acid ester may be 102 mgKOH/g or more and 122 mgKOH/g or less. The partially saponified montanic acid ester of which the saponification value is within the above-described range is superior to a partially saponified montanic acid ester of which the saponification value is outside of the above-described range in that the flowability and fillability of the compound of which the content of metal powder is 96 mass % or more are improved.

The saponified montanic acid ester may contain calcium. In other words, the saponified montanic acid ester may contain calcium montanate. The saponified montanic acid ester that contains calcium montanate is superior to a saponified montanic acid ester that contains the metal salts other than the calcium montanate in that the flowability and fillability of the compound of which the content of metal powder is 96 mass % or more are improved.

The wax may contain both metal salts of lauric acid and saponified montanic acid esters. The compound that contains both metal salts of lauric acid and saponified montanic acid esters tends to have more excellent flowability than that of the compound that contains only one selected from the group consisting of metal salts of lauric acid, metal salts of stearic acid, and saponified montanic acid esters.

The mass of the metal salts of lauric acid in the compound is $M_L$, the mass of saponified montanic acid esters in the compound is $M_M$, and $M_L/M_M$ may be 1/3 or more and 6/1 or less, preferably 1/2 or more and 4/1 or less, and more preferably 1/1 or more and 2/1 or less. As the content of the metal powder in the compound increases, the releasability of the molded article formed from the compound tends to deteriorate. However, when $M_L/M_M$ is within the above-described range, the releasability of the molded article is improved.

At least one selected from the group consisting of the metal salts of lauric acid, the metal salts of stearic acid, and the saponified montanic acid esters may contain zinc (Zn). In other words, the metal salt of lauric acid may be zinc laurate. The metal salt of stearic acid may be zinc stearate. The metal salt of montanic acid contained in the saponified montanic acid ester may be zinc montanate. Zinc laurate and zinc stearate are superior to other metal soaps in that the flowability and fillability of a compound of which the content of metal powder is 96 mass % or more are improved.

At least one selected from the group consisting of the metal salts of lauric acid, the metal salts of stearic acid, and the saponified montanic acid esters (metal salts of montanic acid) may contain at least one selected from the group consisting of alkali metal elements and alkaline earth metal elements. The alkali metal elements may be at least one selected from the group consisting of, for example, lithium (Li), sodium (Na), potassium (K), rubidium (Rb), and cesium (Ce). The alkaline earth metal elements may be at least one selected from the group consisting of, for example, calcium (Ca), strontium (Sr), and barium (Ba). At least one selected from the group consisting of the metal salts of lauric acid, the metal salts of stearic acid, and the saponified montanic acid esters (metal salts of montanic acid) may contain at least one of aluminum (Al) and magnesium (Mg).

The total content of the metal salts of lauric acid, the metal salts of stearic acid, and the saponified montanic acid esters in the compound may be 2 parts by mass or more and 20 parts by mass or less, or 2 parts by mass or more and 15 parts by mass or less with respect to 100 parts by mass of the epoxy resin. In a case where the total content of the metal salts of lauric acid, the metal salts of stearic acid, and the saponified montanic acid esters is within the above-described range, the flowability and fillability of the compound are likely to be improved, the mechanical strength of the molded article formed from the compound is likely to increase, and the releasability of the molded article is likely to be improved.

The compound may further contain other waxes in addition to the waxes selected from the group consisting of the metal salts of lauric acid, the metal salts of stearic acid, and the saponified montanic acid esters. Other waxes may be appropriately selected depending on the flowability, fillability, and releasability of the compound, the temperature and pressure during molding, and the melting point, dropping point, and melt viscosity of the wax.

For example, the other waxes may be at least one selected from the group consisting of carnauba wax, paraffin wax, amide waxes, ester waxes, microwax, polyethylene, polypropylene, polyethylene oxide, grafted polyolefins, copolymers, lauric acid, stearic acid, montanic acid, 12-acetyloxystearic acid, 12-acetyloxystearic acid ester, metal salts of 12-acetyloxystearic acid, linoleic acid, linoleic acid ester, metal salts of linoleic acid, zinc 2-ethylhexanoate, stearic acid amide, oleic acid amide, erucic acid amide, behenic acid amide, palmitic acid amide, lauric acid amide, hydroxystearic acid amide, methylene bisstearic acid amide, ethylene bisstearic acid amide, ethylene bislauric acid amide, distearyl adipic acid amide, ethylene bisoleic acid amide, dioleyl adipic acid amide, N-stearyl erucic acid amide, N-oleyl stearic acid amide, N-stearyl stearic acid amide, methylol stearic acid amide, methylol bechenic acid amide, ethylene glycol, stearyl alcohol, polyethylene glycol, polypropylene glycol, polytetramethylene glycol, silicone oil, silicone grease, fluorine-based oil, and fluorine-based grease.

(Resin Composition)

The resin composition functions as a binding material (binder) for the metal particles constituting the metal powder and imparts mechanical strength to the molded article formed from the compound. For example, the resin composition contained in the compound fills the space between the metal particles and binds the metal particles to each other when the compound is molded at high pressure by using a metal mold. By curing the resin composition in the molded article, the cured product of the resin composition more firmly binds the metal particles to each other, and a cured product of the compound having excellent mechanical strength can be obtained.

The content of the resin composition in the compound is more than 0 mass % and 4 mass % or less, preferably 0.2 mass % or more and 4 mass % or less, 1 mass % or more and 4 mass % or less, and 2 mass % or more and 4 mass % or less, or 2.5 mass % or more and 3.9 mass % or less.

The resin composition contains at least an epoxy resin as a thermosetting resin. When the compound contains an epoxy resin having relatively excellent flowability among thermosetting resins, the flowability, fillability, storage stability, and moldability of the compound are improved. However, the compound may contain other resins in addition to an epoxy resin as long as the effects of the present invention are not impaired. For example, the resin composition may contain at least one of a phenol resin and a polyamide-imide resin as a thermosetting resin. In a case where the resin composition contains both an epoxy resin and a phenol resin, the phenol resin may function as a curing agent for the epoxy resin. The resin composition may further contain a thermoplastic resin in addition to the thermosetting resin. The thermoplastic resin may be at least one selected from the group consisting of, for example, an acrylic resin, polyethylene, polypropylene, polystyrene, polyvinylchloride, polyethylene terephthalate, and rubber (elastomer). The resin composition may contain a silicone resin.

The epoxy resin may be, for example, a resin having two or more epoxy groups in one molecule. The epoxy resin may be at least one selected from the group consisting of, for example, biphenyl-type epoxy resins, biphenyl aralkyl type epoxy resins, biphenylene aralkyl type epoxy resins, stilbene type epoxy resins, diphenylmethane type epoxy resin, sulfur atom-containing type epoxy resin, novolac type epoxy resin, dicyclopentadiene type epoxy resin, salicylaldehyde type epoxy resin, copolymer type epoxy resin of naphthols and phenols, epoxy compounds of aralkyl type phenol resins, bisphenol type epoxy resin, epoxy resins containing a bisphenol skeleton, alcohol glycidyl ether type epoxy resin, glycidyl ether type epoxy resin of paraxylylene and/or metaxylylene-modified phenol resin, glycidyl ether-type epoxy resins of terpene-modified phenol resins, cyclopentadiene-type epoxy resins, glycidyl ether-type epoxy resins of polycyclic aromatic ring-modified phenol resins, glycidyl ether type epoxy resin of naphthalene ring containing phenol resin, glycidyl ester type epoxy resin, glycidyl type or methyl glycidyl type epoxy resin, alicyclic epoxy resin, halogenated phenol novolac type epoxy resin, orthocresol novolac type epoxy resin, hydroquinone type epoxy resin, trimethylolpropane-type epoxy resins, and linear aliphatic epoxy resin obtained by oxidizing an olefin bond with a peracid such as peracetic acid.

From the viewpoint of excellent flowability, the epoxy resin may be at least one selected from the group consisting of biphenyl type epoxy resin, orthocresol novolac type epoxy resin, phenol novolac type epoxy resin, bisphenol type epoxy resin, epoxy resin having a bisphenol skeleton, salicylaldehyde novolac type epoxy resin, and naphthol novolac type epoxy resin.

The epoxy resin may be a crystalline epoxy resin. Despite the relatively low molecular weight of crystalline epoxy resins, crystalline epoxy resins have a relatively high melting point and excellent flowability. The crystalline epoxy resin (highly crystalline epoxy resin) may be at least one selected from the group consisting of, for example, a hydroquinone type epoxy resin, a bisphenol type epoxy resin, a thioether type epoxy resin, and a biphenyl type epoxy resin. Commercially available crystalline epoxy resins may be at least one selected from the group consisting of, for example, Epiclon 860, Epiclon 1050, Epiclon 1055, Epiclon 2050, Epiclon 3050, Epiclon 4050, Epiclon 7050, Epiclon HM-091, Epiclon HM-101, Epiclon N-730A, Epiclon N-740, Epiclon N-770, Epiclon N-775, Epiclon N-865, Epiclon HP-4032D, Epiclon HP-7200L, Epiclon HP-7200, Epiclon HP-7200H, Epiclon HP-7200HH, Epiclon HP-7200HH, Epiclon HP-4700, Epiclon HP-4710, Epiclon HP-4770, Epiclon HP-5000, Epiclon HP-6000, N500P-2, and N500P-10 (the above are manufacturing trade names of DIC Corporation); NC-3000, NC-3000-L, NC-3000-H, NC-3100, CER-3000-L, NC-2000-L, XD-1000, NC-7000-L, NC-7300-L, EPPN-501H, EPPN-501HY, EPPN-502H, EOCN-1020, EOCN-102S, EOCN-103S, EOCN-104S, CER-1020, EPPN-201, BREN-S, and BREN-10S (the above are manufacturing trade names of Nippon Kayaku Co., Ltd.); and YX-4000, YX-4000H, YL4121H, and YX-8800 (the above are manufacturing trade names of Mitsubishi Chemical Corporation).

From the viewpoint that the molding shrinkage rate of the compound is likely to be reduced, the resin composition may contain an isocyanate-modified epoxy resin as the epoxy resin. A commercially available product of the isocyanate-modified epoxy resin may be, for example, AER-4001 manufactured by Asahi Kasei Corporation (formerly Asahi Kasei E-Materials Corporation).

The resin composition may contain one of the above-described epoxy resins. The resin composition may contain multiple types of epoxy resins among the above.

The curing agent is classified into a curing agent that cures the epoxy resin in the range of a low temperature to room temperature and a heat curing type curing agent that cures the epoxy resin with heating. The curing agent that cures the epoxy resin in the range of a low temperature to room temperature is, for example, an aliphatic polyamine, a polyaminoamide, or a polymercaptan. The heat curing type curing agent is, for example, an aromatic polyamine, an acid anhydride, a phenol novolac resin, dicyandiamide (DICY) and the like.

In a case where a curing agent that cures the epoxy resin in the range of a low temperature to room temperature is used, the glass transition point of the cured product of the epoxy resin is low, and the cured product of the epoxy resin tends to be soft. As a result, the molded article formed from the compound also tends to become soft. Meanwhile, from the viewpoint of improving the heat resistance of the molded article, the curing agent is preferably a heat-curing type curing agent, more preferably a phenol resin, and further preferably a phenol novolac resin. In particular, by using a phenol novolac resin as a curing agent, it is easy to obtain a cured product of an epoxy resin having a high glass transition point. As a result, the heat resistance and mechanical strength of the molded article are likely to be improved.

The phenolic resin may be at least one selected from the group consisting of, for example, an aralkyl type phenol resin, a dicyclopentadiene type phenol resin, a salicylaldehyde type phenol resin, a novolac type phenol resin, a copolymerizable phenol resin of benzaldehyde type phenol and aralkyl type phenol, paraxylylene and/or metaxylylene-modified phenol resin, melamine-modified phenol resin, terpene-modified phenol resin, dicyclopentadiene type naphthol resin, cyclopentadiene-modified phenol resin, polycyclic aromatic ring-modified phenol resin, biphenyl type phenol resin, and triphenylmethane type phenol resin. The phenol resin may be a copolymer consisting of two or more of the above. As a commercially available phenol resin, for example, Tamanol 758 manufactured by Arakawa Chemical Industries, Ltd., HP-850N manufactured by Hitachi Chemical Co., Ltd., or the like may be used.

The phenol novolac resin may be, for example, a resin obtained by condensing or co-condensing phenols and/or naphthols and aldehydes under an acid catalyst. The phenols constituting the phenol novolac resin may be at least one selected from the group consisting of, for example, phenol, cresol, xylenol, resorcin, catechol, bisphenol A, bisphenol F, phenylphenol, and aminophenol. The naphthols constituting the phenol novolac resin may be at least one selected from the group consisting of, for example, α-naphthol, β-naphthol and dihydroxynaphthalene. The aldehydes constituting the phenol novolac resin may be at least one selected from the group consisting of, for example, formaldehyde, acetaldehyde, propionaldehyde, benzaldehyde, and salicylaldehyde.

The curing agent may be, for example, a chemical compound having two phenolic hydroxyl groups in one molecule. The chemical compounds having two phenolic hydroxyl groups in one molecule may be at least one selected from the group consisting of, for example, resorcin, catechol, bisphenol A, bisphenol F, and substituted or unsubstituted biphenol.

The resin composition may contain one of the above-described phenol resins. The resin composition may include multiple types of phenol resins among the above. The resin composition may contain one of the above-described curing agents. The resin composition may contain multiple types of curing agents among the above.

The proportion of the active group (phenolic OH group) in the curing agent that reacts with the epoxy group in the epoxy resin is preferably 0.5 to 1.5 equivalents, more preferably 0.6 to 1.4 equivalents, and further preferably 0.8 to 1.2 equivalents with respect to 1 equivalent of the epoxy group in the epoxy resin. In a case where the proportion of active group in the curing agent is less than 0.5 equivalents, it is difficult to obtain a sufficient elastic modulus of the obtained cured product. Meanwhile, in a case where the proportion of active group in the curing agent exceeds 1.5 equivalents, the mechanical strength of the molded article formed from the compound after curing tends to decrease.

The curing accelerator is not limited as long as the curing accelerator is a composition that reacts with the epoxy resin to accelerate the curing of the epoxy resin, for example. The curing accelerator may be, for example, imidazoles such as an alkyl group-substituted imidazole or benzimidazole. The resin composition may include one type of curing accelerator. The resin composition may include multiple types of curing accelerators. When the resin composition contains a curing accelerator, the moldability and releasability of the compound are likely to be improved. Further, when the resin composition contains a curing accelerator, the mechanical strength of the molded article (for example, an electronic component) manufactured by using the compound is improved, and the storage stability of the compound under a high temperature and high humidity environment is improved. As the commercially available imidazole-based curing accelerator, at least one selected from the group consisting of, for example, 2MZ-H, C11Z, C17Z, 1,2DMZ, 2E4MZ, 2PZ-PW, 2P4MZ, 1B2MZ, 1B2PZ, 2MZ-CN, C11Z-CN, 2E4MZ-CN, 2PZ-CN, C11Z-CNS, 2P4MHZ, TPZ, and SFZ (the above are manufacturing trade names of Shikoku Chemicals Corporation) may be used.

The blending amount of the curing accelerator is not particularly limited as long as the blending amount is an amount that can obtain the curing promoting effect. However, from the viewpoint of improving the curability and flowability of the resin composition during moisture absorption, the blending amount of the curing accelerator may be preferably 0.1 parts by mass or more and 30 parts by mass or less, and more preferably 1 part by mass or more and 15 parts by mass or less with respect to 100 parts by mass of the epoxy resin. The content of the curing accelerator is preferably 0.001 parts by mass or more and 5 parts by mass or less with respect to 100 parts by mass in total of the mass of the epoxy resin and the curing agent (for example, phenol resin). In a case where the blending amount of the curing accelerator is less than 0.1 parts by mass, it is difficult to obtain a sufficient curing promoting effect. In a case where the blending amount of the curing accelerator exceeds 30 parts by mass, the storage stability of the compound is likely to decrease.

The coupling agent improves the adhesion between the resin composition and the metal particles constituting the metal powder, and improves the flexibility and mechanical strength of the molded article formed from the compound. The coupling agent may be, for example, at least one selected from the group consisting of a silane compound (silane coupling agent), a titanium compound, an aluminum compound (aluminum chelate), and an aluminum/zirconium compound. The silane coupling agent may be at least one selected from the group consisting of, for example, epoxysilanes, mercaptosilanes, aminosilanes, alkylsilanes, ureidosilanes, acid anhydride-based silanes, and vinylsilanes. In particular, an aminophenyl-based silane coupling agent is preferable. The resin composition may contain one of the above-described coupling agents, and may contain multiple types of the coupling agents among the above. The commercially available coupling agent may be at least one selected from the group consisting of, for example, vinyltrimethoxysilane (KBM-1003), vinyltriethoxysilane (KBE-1003), 2-(3,4-epoxycyclohexyl)ethyltrimethoxysilane (KBM-303), 3-glycydoxypropylmethyldimethoxysilane (KBM-402), 3-glycidoxypropyltrimethoxysilane (KBM-403), p-styryltrimethoxysilane (KBM-1403), 3-methacryloxypropylmethyldimethoxysilane (KBM-502), 3-methacryloxypropyltrimethoxysilane (KBM-503), 3-methacryloxypropylmethyldiethoxysilane (KBE-502), 3-methacryloxypropyltriethoxysilane (KBE-503), 3-acryloxypropyltrimethoxysilane (KBM-5103), N-2-(aminoethyl)-3-aminopropylmethyldimethoxysilane (KBM-602), N-2-(aminoethyl)-3-aminopropyltrimethoxysilane (KBM-603), 3-aminopropyltrimethoxysilane (KBM-903), 3-aminopropyltriethoxysilane (KBE-903), 3-triethoxysilyl-N-(1,3-dimethyl-butylidene)propylamine (KBE-9103), N-phenyl-3-aminopropyltrimethoxysilane (KBM-573), N-vinylbenzyl-2-aminoethyl-3-aminopropyltrimethoxysilane hydrochloride (KBM-575), tris-(trimethoxysilylpropyl) isocyanurate (KBM-9659), 3-ureidopropyltrialkoxysilane (KBE-585), 3-mercaptopropylmethyldimethoxysilane (KBM-802), 3-mercaptopropyltrimethoxysilane (KBM-803), 3-isocyanatopropyltriethoxysilane (KBM-9007), octenyltrimethoxysilane (KBM-1083), glycidoxyoctyltrimethoxysilane (KBM-4803), methacryloxyltrimethoxysilane (KBM-5803), methyltrimethoxysilane (KBM-13), methyltriethoxysilane (KBE-13), dimethyldimethoxysilane (KBM-22), dimethyldiethoxysilane (KBE-22), phenyltrimethoxysilane (KBM-103), phenyltriethoxysilane (KBE-103), n-propyltrimethoxysilane (KBM-3033), n-propyltriethoxysilane (KBE-3033), hexyltrimethoxysilane (KBM-3063), hexyltriethoxysilane (KBE-3063), octyltriethoxysilane (KBE-3083), decyltrimethoxysilane (KBM-3103C), 1,6-(trimethoxysilyl)hexane (KBM-3066), trifluoropropyltrimethoxysilane (KBM-7103), hexamethyldisilazane (SZ-31), and a hydrolyzable group-containing siloxane (KPN-3504) (the above are manufacturing trade names of Shin-Etsu Chemical Industry Co., Ltd.). The coupling agent may be a silicone alkoxy oligomer (silicone oligomer having an alkoxy group). The silicone alkoxy oligomer may have at least one alkoxy group such as a methoxy group and an ethoxy group. The silicone alkoxy oligomer may have at least one organic substituent selected from the group consisting of an epoxy group, a methyl group, a mercapto group, an acryloyl group, a methacryloyl group, a vinyl group, and a phenyl group. The silicone alkoxy oligomer may be at least one selected from the group consisting of, for example, KR-517, X-41-1059A, X-24-9590, KR-516, X-41-1805, X-41-1818, X-41-1810, KR-513, X-40-9296, KR-511, KC-89S, KR-515, KR-500, X-40-9225, X-40-9246, X-40-9250, KR-41N, X-40-9227, KR-510, KR-9218, and KR-213 (the above are manufacturing trade names of Shin-Etsu Chemical Industry Co., Ltd.).

Due to the environmental safety, recyclability, molding processability, and low cost of the compound, the compound may contain a flame retardant. The flame retardant may be at least one selected from the group consisting of, for example, a brominated flame retardant, a bulb flame retardant, a hydrated metal compound flame retardant, a silicone flame retardant, a nitrogen-containing compound, a hindered amine compound, an organic metal compound, and aromatic engineering plastic. The resin composition may contain one of the above-described flame retardants, and may contain multiple types of the flame retardants among the above.

(Metal Powder)

The metal powder may be represented by a filling material (filler). The metal powder may contain, for example, at least one selected from the group consisting of elemental metals and alloys. The metal powder may be at least one selected from the group consisting of, for example, elemental metals, alloys, amorphous powders, and metal compounds. The alloy may include at least one selected from the group consisting of solid solutions and eutectic and intermetallic compounds (intermetallic chemical compound). The alloy may be, for example, stainless steel (Fe—Cr alloy, Fe—Ni—Cr alloy, and the like). The metal powder may contain one type of metal element or multiple types of metal elements. The metal element contained in the metal powder may be, for example, a base metal element, a noble metal element, a transition metal element, or a rare earth element. The compound may contain one type of metal powder and may contain multiple types of metal powders.

The metal elements contained in the metal powder may be at least one selected from the group consisting of, for example, iron (Fe), copper (Cu), titanium (Ti), manganese (Mn), cobalt (Co), nickel (Ni), zinc (Zn), aluminum (Al), tin (Sn), chromium (Cr), barium (Ba), strontium (Sr), lead (Pb), silver (Ag), praseodymium (Pr), neodymium (Nd), samarium (Sm), and dysprosium (Dy). The metal powder may contain elements other than metal elements. For example, the metal powder may contain oxygen (O), beryllium (Be), phosphorus (P), boron (B), or silicon (Si). The metal powder may be a magnetic powder. The metal powder may be a soft magnetic alloy or a ferromagnetic alloy. The metal powder may be a magnetic powder consisting of at least one selected from the group consisting of, for example, a Fe—Si alloy, a Fe—Si—Al alloy (Sendust), an Fe—Ni alloy (Permalloy), an Fe—Cu—Ni alloy (Permalloy), an Fe—Co alloy (Permalloy), an Fe—Cr—Si alloy (electromagnetic stainless steel), an Nd—Fe—B alloy (rare earth magnet), an Sm—Fe—N alloy (rare earth magnet), and an Al—Ni—Co alloy (Alnico magnet). The metal powder may be a copper alloy such as a Cu—Sn alloy, a Cu—Sn—P alloy, a Cu—Ni alloy, or a Cu—Be alloy. The metal powder may consist of only one type of element and composition. The metal powder may contain multiple elements or compositions.

The metal powder may be Fe alone. The metal powder may be an alloy containing iron (Fe-based alloy). The Fe-based alloy may be, for example, an Fe—Si—Cr alloy or an Nd—Fe—B alloy. The metal powder may be at least one of amorphous iron powder and carbonyl iron powder. In a case where the metal powder contains at least one of Fe alone or an Fe-based alloy, it is easy to prepare a compound having high occupancy and excellent magnetic characteristics. The metal powder may be an Fe amorphous alloy. As the commercially available Fe amorphous alloy powder, at least one selected from the group consisting of, for example, AW2-08 and KUAMET-6B2 (the above are manufacturing trade names of Epson Atmix Co., Ltd.); DAP MS3, DAP MS7, DAP MSA10, DAP PB, DAP PC, DAP MKV49, DAP 410L, DAP 430L, and DAP HYB series (the above are manufacturing trade names of Daido Special Steel Co., Ltd.); and MH45D, MH28D, MH25D, and MH20D (the above are manufacturing trade names of Kobe Steel Co., Ltd.) may be used.

The average particle size of the metal powder is not particularly limited, but may be 1 µm or more and 300 µm or less, for example. The average particle size may be measured, for example, by a particle size analyzer. The shape of each of the metal particles constituting the metal powder is not limited, but may be, for example, a spherical, flat, prismatic, or needle shape. The compound may include multiple types of metal powders with different average particle sizes.

<Application of Compound>

The compound may be used for transfer molding. Transfer molding is one type of injection molding method for thermosetting resins. Transfer molding may be represented by pressure feeding molding. Transfer molding may include a step of heating the compound in a heating chamber to fluidize the compound, and a step of supplying (press-fitting) the fluidized compound from the heating chamber into the metal mold through a casting runner. Transfer molding may include a step of heating the compound in the heating chamber to fluidize the compound, and a step of supplying the fluidized compound powder from the heating chamber into a plunger and supplying (press-fitting) the compound from the plunger into the metal mold through the casting runner. Since the compound according to the present embodiment exhibits excellent flowability and fillability when heated, the compound flows easily in the narrow casting runner and is likely to fill the space (cavity) in the metal mold without unevenness. Therefore, by processing the compound by transfer molding, it is possible to manufacture a molded article and a cured product having few defects such as voids or burr. The molding method of the compound can be compression molding.

Depending on the composition or combination of metal powders contained in the compound, the various characteristics (for example, electromagnetic characteristics or magnetic characteristics) of each of the molded article and the cured product formed from the compound can be freely controlled. Therefore, the molded article and the cured product can be used for various industrial products or raw materials thereof. The molded article formed from the compound may include at least one of an uncured resin composition and a B-stage resin composition (semi-cured product of the resin composition). The molded article may consist only of the compound. The cured product of the compound or the cured product of the molded article may contain a C-stage resin composition (cured product of the resin composition).

Industrial products manufactured by using the compound may be, for example, automobiles, medical equipment, electronic equipment, electrical equipment, information and communication equipment, home appliances, audio equipment, and general industrial equipment. For example, in a case where the compound contains a permanent magnet such as an Sm—Fe—N alloy or an Nd—Fe—B alloy as the metal powder, the compound may be used as a material for a bonded magnet. In a case where the compound contains a soft magnetic material such as an Fe—Si—Cr alloy as the metal powder, the compound may be used as an inductor (for example, EMI filter) or a transformer material (for example, encapsulant or magnetic core). A molded article (for example, sheet) formed from the compound may be used as an electromagnetic shield.

<Manufacturing Method of Compound>

The compound is obtained by mixing the metal powder with the resin composition while heating. For example, the metal powder and the resin composition may be kneaded with a kneader, a roller, or a stirrer while heating. By heating and mixing the metal powder and the resin composition, the resin composition adheres to a part or the whole of the surface of each metal particle constituting the metal powder and coats each metal particle. By mixing, a part or the whole of the epoxy resin in the resin composition may become a semi-cured product.

For example, metal powder, an epoxy resin, a wax, a curing agent such as a phenol resin, a curing accelerator, and a coupling agent may be kneaded together in a tank. After the metal powder and the coupling agent are mixed in the tank, the metal powder, the coupling agent, the wax, the epoxy resin, the curing agent, and the curing accelerator may be further kneaded in the tank. After the metal powder, the epoxy resin, the wax, the curing agent, and the coupling agent are kneaded in the tank, the mixture of these materials and the curing accelerator may be further kneaded in the tank. The epoxy resin, the wax, the curing agent, and the curing accelerator may be mixed in advance to prepare the resin mixed powder. The metal powder and the coupling agent may be mixed in advance to prepare a metal mixed powder. The compound may be obtained by kneading the metal mixed powder with the above-described resin mixed powder.

The kneading time also depends on the type of kneading machine, the volume of the kneading machine, and the amount of compound manufactured. The kneading time is, for example, preferably 1 minute or longer, more preferably 2 minutes or longer, and further preferably 3 minutes or longer. In addition, the kneading time is preferably 20 minutes or less, more preferably 15 minutes or less, and further preferably 10 minutes or less. In a case where the kneading time is less than 1 minute, the kneading is insufficient, the moldability of the compound is impaired, and the degree of curing of the compound varies. In a case where the kneading time exceeds 20 minutes, for example, the resin composition (for example, epoxy resin and phenol resin) is cured in the tank, and the flowability, fillability, and moldability of the compound are easily impaired. In a case of performing kneading with a kneader while heating the raw materials in the tank, the heating temperature may be, for example, a temperature at which the semi-cured product of the epoxy resin (B-stage epoxy resin) may be generated and the generation of the cured product of the epoxy resin (C-stage epoxy resin) may be suppressed. The heating temperature may be lower than the activation temperature of the curing accelerator. The heating temperature is, for example, preferably 50° C. or higher, more preferably 60° C. or higher, and further preferably 70° C. or higher. The heating temperature is preferably 150° C. or lower, more preferably 120° C. or lower, and further preferably 110° C. or lower. In a case where the heating temperature is within the above-described range, the resin composition in the tank softens and easily coats the surface of the metal particles constituting the metal powder, the semi-cured product of the epoxy resin is easily generated, and the complete curing of the epoxy resin during kneading is easily suppressed.

EXAMPLES

In the following, the present invention is described in more detail with reference to Examples and Comparative Examples. The present invention is not limited to these examples in any manner.

Example 1

[Preparation of Compound]

100 g of biphenylene aralkyl type epoxy resin, 38 g of phenol novolac resin (curing agent), 2 g of 2-undecylimidazole (curing accelerator), 2 g of 2-ethyl-4-methylimidazole (curing accelerator), and 2.0 g of zinc laurate (wax) were placed in a plastic container. A resin mixture was prepared by mixing the contents of the plastic container for 10 minutes. The resin mixture corresponds to all the other components of the resin composition excluding the coupling agent.

As the biphenylene aralkyl type epoxy resin, NC-3000 (epoxy equivalent: 200 g/eq) manufactured by Nippon Kayaku Co., Ltd. was used.

As the phenol novolac resin (curing agent), HP-850N (hydroxyl equivalent: 106 g/eq) manufactured by Hitachi Chemical Co., Ltd. was used.

As 2-undecylimidazole (curing accelerator), C11Z manufactured by Shikoku Chemicals Corporation was used.

As 2-ethyl-4-methylimidazole (curing accelerator), 2E4MZ manufactured by Shikoku Chemicals Corporation was used.

As zinc laurate (wax), a powder base L manufactured by NOF Corporation was used. In Table 1 below, zinc laurate is referred to as "ZnLa".

An amorphous iron powder 1 and an amorphous iron powder 2 were uniformly mixed in a pressurized biaxial kneader for 5 min to prepare metal powder. The mass of the amorphous iron powder 1 is shown in Table 1 below. The mass of the amorphous iron powder 2 is shown in Table 1 below. The mass of the entire metal powder is shown in Table 1 below. The mass of the entire metal powder is the sum of the mass of the amorphous iron powder 1 and the mass of the amorphous iron powder 2.

As the amorphous iron powder 1, 9A4-II 075C03 manufactured by Epson Atmix Corporation was used. The average particle size of the amorphous iron powder 1 was 24 μm.

As the amorphous iron powder 2, AW2-08 manufactured by Epson Atmix Corporation was used. The average particle size of amorphous iron powder 2 was 5.3 μm.

As a pressurized biaxial kneader, a pressurized biaxial kneader manufactured by Nihon Spindle Manufacturing Co., Ltd. was used. The capacity of the pressurized biaxial kneader was 5 L.

7.5 g of methacryloxyoctyltrimethoxysilane (coupling agent) and 30 g of caprolactone-modified dimethylsilicone (stress relieving agent) were added to the metal powder in a biaxial kneader. Subsequently, the contents of the biaxial kneader were heated to 90° C., and the contents of the biaxial kneader were mixed for 10 minutes while maintaining the temperature. Then, after adding the above-described resin mixture to the contents of the biaxial kneader, the contents were kneaded for 15 minutes while maintaining the temperature of the contents at 120° C. After cooling the obtained kneaded product to room temperature, the kneaded product was crushed with a hammer until the kneaded product had a predetermined particle size.

As methacryloxyoctyltrimethoxysilane, KBM-5803 manufactured by Shin-Etsu Chemical Co., Ltd. was used.

As the caprolactone-modified dimethylsilicone (stress relieving agent), DBL-C32 manufactured by Gelest, Inc. was used.

The compound of Example 1 was prepared by the above-described method. The content of the metal powder in the compound was 96.5 mass %.

[Evaluation of Flowability]

Figure 1:
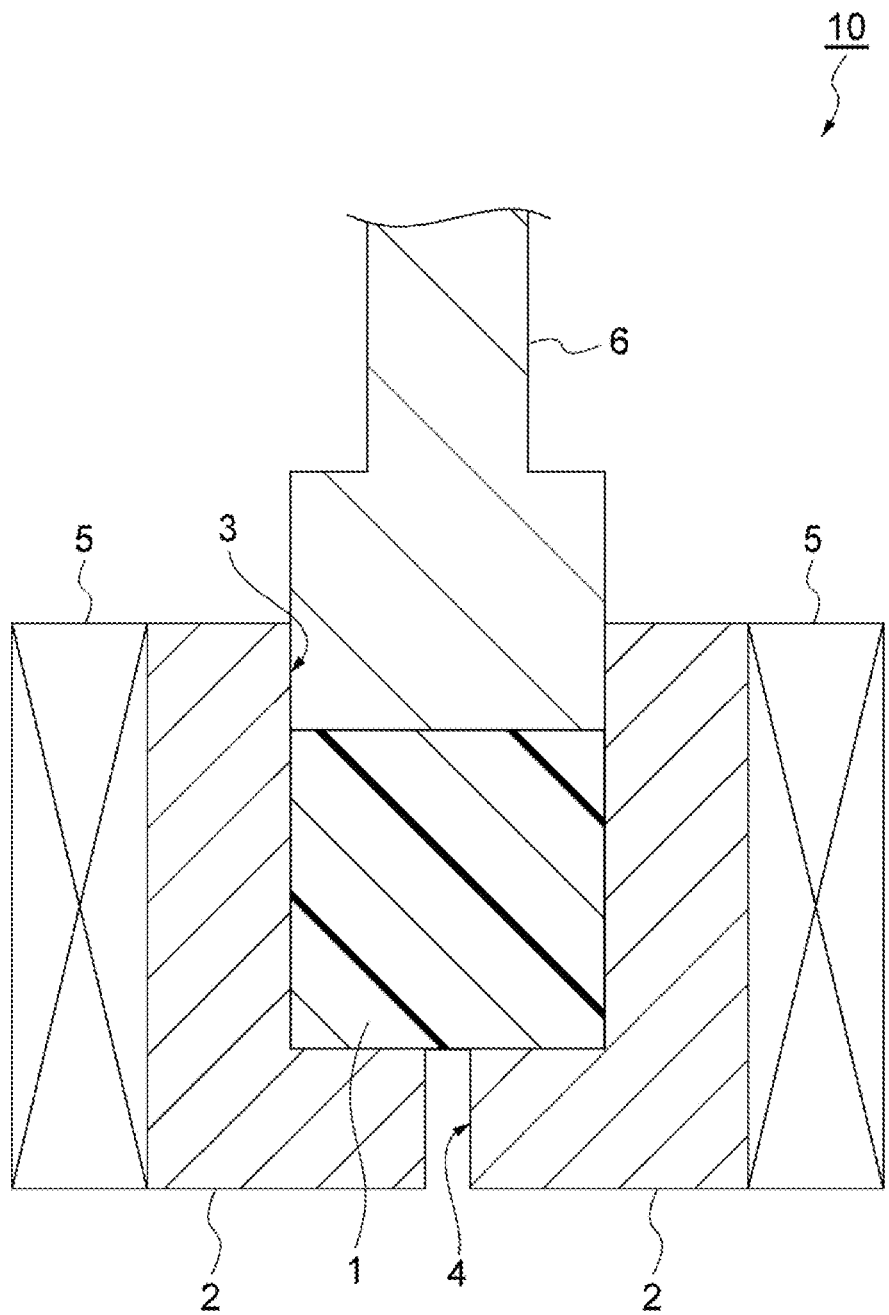
FIG. 1 is a schematic sectional view of a flow tester for evaluating flowability of a compound.

The flowability of the compound of Example 1 was evaluated by the following method using a flow tester. As the flow tester, CFT-100 manufactured by Shimadzu Corporation was used. FIG. 1 is a schematic sectional view of a flow tester 10. The flow tester 10 includes a cylinder 2, a heater 5 that surrounds the side surfaces of the cylinder 2, and a plunger 6 that fits into the cylinder 2. The plunger 6 is inserted into the cylinder 2 through an opening part 3. A circular discharge hole 4 (orifice) is formed at the end part of the cylinder 2 on the opposite side of the opening part 3. The inner diameter of the discharge hole 4 is 1 mm. By molding 7 g of the compound, a tablet-shaped compound 1 made of the compound was prepared. The compound 1 was installed in the cylinder 2. Using a heater 5, the compound 1 in the cylinder 2 was preheated at 130° C. for 20 seconds. Following the preheating, the plunger 6 was pushed into the cylinder 2 and the compound 1 in the cylinder 2 was pressurized by the plunger 6. The load exerted by the plunger 6 on the compound 1 was 100 kg. The time point when the compound begins to flow out of the discharge hole 4 is represented as t0. The time point when the outflow of compound from the discharge hole 4 stops is represented as t1. A flow time T is defined as t1-t0. A flow stroke L is defined as the moving distance of the plunger 6 during the flow time T.

The flow time T and the flow stroke L of the compound of Example 1 were measured by the above-described method. The measurement results are shown in Table 1 below. Excellent flowability of the compound means the short flow time T and the long flow stroke L. In other words, the greater the L/T, the better the flowability of the compound.

(Evaluation of Fillability)

The fillability of the compound of Example 1 was evaluated by the following method. (a) of FIG. 2 and (b) of FIG. 2 are schematic sectional views of a metal mold 20 used to evaluate the fillability. FIG. 3 is a schematic top view of the metal mold 20. The sections shown in (a) of FIG. 2 and (b) of FIG. 2 are parallel to the vertical direction. The metal mold 20 includes a lower mold 19, a frame 21 that is installed on the lower mold 19, and an upper mold 17 that overlaps the frame 21. The surface of the frame 21 is coated with silver (Ag). A cavity 14 (space) is formed in the metal mold 20. The overall dimensions of the cavity 14 are approximately 49.4 mm×43.4 mm. On the surface of the upper mold 17 facing the frame 21, 168 cylindrical convex parts 15 are formed in a grid pattern. As the end surface of each convex part 15 of the upper mold 17 is in contact with the surface of the frame 21, the 168 cylindrical convex parts 15 are arranged in a grid pattern in the cavity 14. In the lateral direction of the cavity 14, 14 convex parts 15 are arranged at equal intervals, and in the longitudinal direction of the cavity 14, 12 convex parts 15 are arranged at equal intervals. The distance between a pair of convex parts 15 aligned in the lateral direction is 3.2 mm. The distance between the pair of convex parts 15 aligned in the longitudinal direction is also 3.2 mm. The distance between the pair of convex parts 15 is represented by a distance between the central axes of each of the 15 cylindrical convex parts 15. The thickness (diameter) of each of the convex parts 15 is 2.4 mm. The height of each convex part 15 is approximately 300 μm. In other words, the depth of the cavity 14 is approximately 300 μm. The depth of the cavity 14 corresponds to the thickness of a molded article 1a formed from the compound 1 using the metal mold 20. The thickness of the frame 21 is 200 μm. The cavity 14 communicates with an accommodation chamber 11 via multiple gates 12 (flow paths) arranged along the lateral direction (horizontal direction). The compound 1 is accommodated in the accommodation chamber 11. The minimum height of each gate 12 is 200 μm. In other words, the minimum width of each gate 12 in the vertical direction is 200 μm. The width of each gate 12 in the horizontal direction is 800 μm. Multiple vents 13 (grooves) that communicate with the cavity 14 are formed on the side surface of the metal mold 20 positioned on the opposite side of the gate 12. The depth of each vent 13 is 10 μm.

Transfer molding was performed by using the above-described metal mold 20. In the transfer molding, the compound 1 in the accommodation chamber 11 was pressurized while the entire metal mold 20 including the accommodation chamber 11 was heated at 140° C. for 360 seconds. The compound 1 was pressurized at 20 MPa. Due to heating and pressurization, the compound 1 in the accommodation chamber 11 was fluidized. The fluidized compound 1 flowed through the gate 12 and then filled the inside of the cavity 14. The molded article was obtained by the above-described transfer molding. FIG. 4 is a schematic top view of the molded article 1a formed from the compound 1. In the transfer molding, the compound 1 filled the space between the multiple convex parts 15 in the cavity 14, and thus, multiple through-holes 16 were formed in the molded article 1a. The shape, arrangement, and number of through-holes 16 correspond to the shape, arrangement, and number of convex parts 15 in the cavity 14. In other words, the total number N of through-holes 16 formed in the molded article 1a is equal to the total number N' of convex parts 15 in the cavity 14. The number n of through-holes 16 having no defects on the inner walls and edges of the through-hole 16 was counted. The filling ratio of the compound 1 is defined as 100×n/N %. The smaller the gap between the compound 1 in the cavity 14 and the metal mold 20, the less defective the molded article 1a is and the higher the 100×n/N %. In other words, the higher the 100×n/N %, the better the fillability of compound. The filling ratio of Example 1 is shown in Table 1 below.

(Evaluation of Releasability)

The releasability of the compound of Example 1 was evaluated by the following method.

After forming the molded article 1a by the above-described method, the molded article 1a was released from the metal mold 20 (surface of the frame 21). The releasability of the compound is the property that prevents the compound 1 derived from the molded article 1a from remaining in the cavity 14 after the molded article 1a is released from the metal mold 20. In other words, the releasability of the compound is the property that prevents the compound 1 derived from the molded article 1a from remaining on the surface of the frame 21 after the molded article 1a is released from the frame 21. The evaluation of the releasability of Example 1 is shown in Table 1 below. A in Table 1 means that the compound 1 derived from the molded article 1a did not remain in the cavity 14. In other words, A means that the molded article 1a has been released from the cavity 14 without damage. B in Table 1 means that the ratio of the area of the entire surface of the frame 21 where the compound 1 derived from the molded article 1a remained was greater than 0% and less than 50%.

Example 2

The mass of zinc laurate used to prepare the resin mixture of Example 2 was 4.0 g. The mass of the amorphous iron powder 1 used in Example 2 is shown in Table 1 below. The mass of the amorphous iron powder 2 used in Example 2 is shown in Table 1 below. The mass of the entire metal powder of Example 2 is shown in Table 1 below. The compound of Example 2 was prepared by the same method as that in Example 1 except for these matters. By the same method as that in Example 1, the flowability, fillability, and releasability of the compound of Example 2 were evaluated. The evaluation results of Example 2 are shown in Table 1 below.

Example 3

In the preparation of the resin mixture of Example 3, zinc stearate was used instead of zinc laurate. The mass of zinc stearate used to prepare the resin mixture of Example 3 was 4.0 g. As zinc stearate, zinc stearate manufactured by NOF Corporation was used. In Table 1 below, zinc stearate is referred to as "ZnSt". The mass of the amorphous iron powder 1 used in Example 3 is shown in Table 1 below. The mass of the amorphous iron powder 2 used in Example 3 is shown in Table 1 below. The mass of the entire metal powder of Example 3 is shown in Table 1 below. The compound of Example 3 was prepared by the same method as that in Example 1 except for these matters. The flowability, fillability, and releasability of the compound of Example 3 were evaluated by the same method as that in Example 1. The evaluation results of Example 3 are shown in Table 1 below.

Example 4

In the preparation of the resin mixture of Example 4, partially saponified montanic acid ester was used instead of zinc laurate. The mass of partially saponified montanic acid ester used to prepare the resin mixture of Example 4 was 4.0 g. As the partially saponified montanic acid ester, LicowaxOP manufactured by Clariant Plastics & Coatings (Japan) K.K. was used. LicowaxOP is a montanic acid ester which is partially saponified by calcium hydroxide. The saponification value of LicowaxOP is 102 mgKOH/g or more and 122 mgKOH/g or less. The mass of the amorphous iron powder 1 used in Example 4 is shown in Table 1 below. The mass of the amorphous iron powder 2 used in Example 4 is shown in Table 1 below. The mass of the entire metal powder of Example 4 is shown in Table 1 below. The compound of Example 4 was prepared by the same method as that in Example 1 except for these matters. By the same method as that in Example 1, the flowability, fillability, and releasability of the compound of Example 4 were evaluated. The evaluation results of Example 4 are shown in Table 1 below.

Example 5

The mass of partially saponified montanic acid ester used to prepare the resin mixture of Example 5 was 8.0 g. The mass of the amorphous iron powder 1 used in Example 5 is shown in Table 1 below. The mass of the amorphous iron powder 2 used in Example 5 is shown in Table 1 below. The mass of the entire metal powder of Example 5 is shown in Table 1 below. The compound of Example 5 was prepared by the same method as that in Example 4 except for these matters. The flowability, fillability, and releasability of the compound of Example 5 were evaluated by the same method as that in Example 1. The evaluation results of Example 5 are shown in Table 1 below.

Example 6

In the preparation of the resin mixture of Example 6, partially saponified montanic acid ester was used in addition to zinc laurate. The partially saponified montanic acid ester used in Example 6 was the above-described LicowaxOP. The mass of zinc laurate used to prepare the resin mixture of Example 6 was 4.0 g. The mass of partially saponified montanic acid ester used to prepare the resin mixture of Example 6 was 2.0 g. The mass of the amorphous iron powder 1 used in Example 6 is shown in Table 1 below. The mass of the amorphous iron powder 2 used in Example 6 is shown in Table 1 below. The mass of the entire metal powder of Example 6 is shown in Table 1 below. The compound of Example 6 was prepared by the same method as that in Example 1 except for these matters. The flow ability, fillability, and releasability of the compound of Example 6 were evaluated by the same method as that in Example 1. The evaluation results of Example 6 are shown in Table 1 below.

Example 7

The mass of zinc laurate used to prepare the resin mixture of Example 7 was 4.0 g. The mass of partially saponified montanic acid ester used to prepare the resin mixture of Example 7 was 4.0 g. The mass of the amorphous iron powder 1 used in Example 7 is shown in Table 1 below. The mass of the amorphous iron powder 2 used in Example 7 is shown in Table 1 below. The mass of the entire metal powder of Example 7 is shown in Table 1 below. The compound of Example 7 was prepared by the same method as that in Example 6 except for these matters. The flowability, fillability, and releasability of the compound in Example 7 were evaluated by the same method as that in Example 1. The evaluation results of Example 7 are shown in Table 1 below.

Comparative Example 1

In the preparation of the resin mixture of Comparative Example 1, montanic acid ester (natural wax) was used instead of zinc laurate. The mass of montanic acid ester used to prepare the resin mixture of Comparative Example 1 was 4.0 g. As the montanic acid ester, LicowaxE manufactured by Clariant Plastics & Coatings (Japan) K.K. was used. The mass of the amorphous iron powder 1 used in Comparative Example 1 is shown in Table 1 below. The mass of the amorphous iron powder 2 used in Comparative Example 1 is shown in Table 1 below. The mass of the entire metal powder of Comparative Example 1 is shown in Table 1 below. According to the blending ratio of the metal mixed powder and the resin mixed powder, the content of the metal powder in the compound of Comparative Example 1 was adjusted to 95.5 mass %. The compound of Comparative Example 1 was prepared by the same method as that in Example 1 except for these matters. The flowability, fillability, and releasability of the compound of Comparative Example 1 were evaluated by the same method as that in Example 1. The evaluation results of Comparative Example 1 are shown in Table 1 below.

Comparative Example 2

The mass of montanic acid ester (LicowaxE) used to prepare the resin mixture of Comparative Example 2 was 8.0 g. The mass of the amorphous iron powder 1 used in Comparative Example 2 is shown in Table 1 below. The mass of the amorphous iron powder 2 used in Comparative Example 2 is shown in Table 1 below. The mass of the entire metal powder of Comparative Example 2 is shown in Table 1 below. According to the blending ratio of the metal mixed powder and the resin mixed powder, the content of the metal powder in the compound of Comparative Example 2 was adjusted to 96.0 mass %. The compound of Comparative Example 2 was prepared by the same method as that in Comparative Example 1 except for these matters. The flowability and fillability of the compound of Comparative Example 2 were evaluated by the same method as that in Example 1. However, the compound of Comparative Example 2 hardly flowed. The compound of Comparative Example 2 having poor flowability did not fill the metal mold. Therefore, it was not possible to measure the flow time, flow stroke, and filling ratio of the compound of Comparative Example 2. The releasability of the compound of Comparative Example 2 was not evaluated.

Comparative Example 3

The mass of the amorphous iron powder 1 used in Comparative Example 3 is shown in Table 1 below. The mass of the amorphous iron powder 2 used in Comparative Example 3 is shown in Table 1 below. The mass of the entire metal powder of Comparative Example 3 is shown in Table 1 below. According to the blending ratio of the metal mixed powder and the resin mixed powder, the content of the metal powder in the compound of Comparative Example 3 was adjusted to 96.5 mass %. The compound of Comparative Example 3 was prepared by the same method as that in Comparative Example 2 except for these matters. The flowability and fillability of the compound of Comparative Example 3 were evaluated by the same method as that in Example 1. However, the compound of Comparative Example 3 hardly flowed. The compound of Comparative Example 3 having poor flowability did not fill the metal mold. Therefore, it was not possible to measure the flow time, flow stroke, and filling ratio of the compound of Comparative Example 3. The releasability of the compound of Comparative Example 3 was not evaluated.

Comparative Example 4

In the preparation of the resin mixture of Comparative Example 4, carnauba wax (natural wax) was used instead of zinc laurate. The mass of carnauba wax used to prepare the resin mixture of Comparative Example 4 was 8.0 g. As carnauba wax, carnauba No. 1 manufactured by Cerarica NODA Corporation was used. The mass of the amorphous iron powder 1 used in Comparative Example 4 is shown in Table 1 below. The mass of the amorphous iron powder 2 used in Comparative Example 4 is shown in Table 1 below. The mass of the entire metal powder of Comparative Example 4 is shown in Table 1 below. The compound of Comparative Example 4 was prepared by the same method as that in Example 1 except for these matters. The flowability and fillability of the compound of Comparative Example 4 were evaluated by the same method as that in Example 1. However, the compound of Comparative Example 4 hardly flowed. The compound of Comparative Example 4 having poor flowability did not fill the metal mold. Therefore, it was not possible to measure the flow time, flow stroke, and filling ratio of the compound of Comparative Example 4. The releasability of the compound of Comparative Example 4 was not evaluated.

Comparative Example 5

In the preparation of the resin mixture of Comparative Example 5, a biphenyl type epoxy resin was used in addition to a biphenylene aralkyl type epoxy resin (NC-3000) as the epoxy resin. As the biphenyl type epoxy resin, YX-4000H (epoxy equivalent: 192 g/eq) manufactured by Mitsubishi Chemical Corporation was used. The mass of the biphenylene aralkyl type epoxy resin (NC-3000) used in Comparative Example 5 was 90 g. The mass of the biphenyl type epoxy resin (YX-4000H) used in Comparative Example 5 was 10 g. The mass of 2-ethyl-4-methylimidazole (2E4MZ) used to prepare the resin mixture of Comparative Example 5 was 1.9 g. In the preparation of the resin mixture of Comparative Example 5, polyethylene (synthetic wax) was used instead of zinc laurate. The mass of polyethylene used to prepare the resin mixture of Comparative Example 5 was 8.0 g. As the polyethylene, LICOCENE PE3101TP manufactured by Clamant Plastics & Coatings (Japan) K.K. was used. The mass of the amorphous iron powder 1 used in Comparative Example 5 is shown in Table 1 below. The mass of the amorphous iron powder 2 used in Comparative Example 5 is shown in Table 1 below. The mass of the entire metal powder of Comparative Example 5 is shown in Table 1 below. The compound of Comparative Example 5 was prepared by the same method as that in Example 1 except for these matters. The flowability and fillability of the compound of Comparative Example 5 were evaluated by the same method as that in Example 1. However, the compound of Comparative Example 5 hardly flowed. The compound of Comparative Example 5 having poor flowability did not fill the metal mold. Therefore, it was not possible to measure the flow time, flow stroke, and filling ratio of the compound of Comparative Example 5. The releasability of the compound of Comparative Example 5 was not evaluated.

TABLE 1

| Table 1 | | Unit | Example | | | | | | | Comparative Example | | | | |
|---|---|---|---|---|---|---|---|---|---|---|---|---|---|---|
| | | | 1 | 2 | 3 | 4 | 5 | 6 | 7 | 1 | 2 | 3 | 4 | 5 |
| Wax | ZnLa | g | 2.0 | 4.0 | 0.0 | 0.0 | 0.0 | 4.0 | 4.0 | 0.0 | 0.0 | 0.0 | 0.0 | 0.0 |
| | ZnSt | g | 0.0 | 0.0 | 4.0 | 0.0 | 0.0 | 0.0 | 0.0 | 0.0 | 0.0 | 0.0 | 0.0 | 0.0 |
| | LicowaxOP | g | 0.0 | 0.0 | 0.0 | 4.0 | 8.0 | 2.0 | 4.0 | 0.0 | 0.0 | 0.0 | 0.0 | 0.0 |
| | LicowaxE | g | 0.0 | 0.0 | 0.0 | 0.0 | 0.0 | 0.0 | 0.0 | 4.0 | 8.0 | 8.0 | 0.0 | 0.0 |
| | Carnauba No.1 | g | 0.0 | 0.0 | 0.0 | 0.0 | 0.0 | 0.0 | 0.0 | 0.0 | 0.0 | 0.0 | 8.0 | 0.0 |
| | LICOCENE PE3101TP | g | 0.0 | 0.0 | 0.0 | 0.0 | 0.0 | 0.0 | 0.0 | 0.0 | 0.0 | 0.0 | 0.0 | 8.0 |

TABLE 1-continued

|  | Table 1 | Unit | Example | | | | | | | Comparative Example | | | | |
|---|---|---|---|---|---|---|---|---|---|---|---|---|---|---|
|  |  |  | 1 | 2 | 3 | 4 | 5 | 6 | 7 | 1 | 2 | 3 | 4 | 5 |
| Metal powder | Amorphous iron powder 1 | g | 3768 | 3809 | 3809 | 3809 | 3892 | 3850 | 3892 | 2932 | 3388 | 3892 | 3892 | 3923 |
|  | Amorphous iron powder 2 | g | 1256 | 1270 | 1270 | 1270 | 1297 | 1283 | 1297 | 977 | 1129 | 1297 | 1297 | 1308 |
|  | Total | g | 5024 | 5079 | 5079 | 5079 | 5189 | 5133 | 5189 | 3909 | 4517 | 5189 | 5189 | 5231 |
| Content of metal powder |  | Mass % | 96.5 | 96.5 | 96.5 | 96.5 | 96.5 | 96.5 | 96.5 | 95.5 | 96.0 | 96.5 | 96.5 | 96.5 |
| Flowability | Flow stroke | mm | 7.2 | 9.8 | 10.0 | 2.5 | 8.5 | 13.4 | 13.4 | 9.0 | — | — | — | — |
|  | Flow time | seconds | 53 | 35 | 35 | 55 | 40 | 35 | 25 | 18 | — | — | — | — |
| Fillability | Filling ratio | % | 52 | 100 | 100 | 40 | 60 | 100 | 100 | 100 | — | — | — | — |
| Releasability | — | — | — | B | B | B | B | B | A | B | A | — | — | — | — |

The content of the metal powder of Comparative Example 1 was less than 96 mass %. As a result, Comparative Example 1 showed flowability and fillability even though any of the metal salts of lauric acid, the metal salts of stearic acid, or the saponified montanic acid esters is not contained.

In all cases of Examples 1 to 7 and Comparative Examples 2 to 4, the content of the metal powder was 96 mass % or more. However, Comparative Examples 2 to 4 did not show flowability and fillability even though the wax was contained. Meanwhile, Examples 1 to 7 showed flowability and fillability since either the metal salts of stearic acid and the saponified montanic acid esters was contained.

INDUSTRIAL APPLICABILITY

Since the compound according to the present invention is excellent in flowability and fillability, it is possible to manufacture industrial products having various shapes such as inductors by molding the compound.

What is claimed is:

1. A compound comprising:
   metal powder, an epoxy resin, a wax, a curing accelerator, and a coupling agent, wherein
   the metal powder is a soft magnetic material, a content of the metal powder is 96 mass % or more and less than 100 mass %,
   the wax contains at least one selected from a group consisting of metal salts of lauric acid, metal salts of stearic acid, and saponified montanic acid esters, and
   the coupling agent comprises methacryloxyoctyltrimethoxysilane.

2. The compound according to claim 1, wherein the wax contains the metal salts of lauric acid and the saponified montanic acid esters.

3. The compound according to claim 1, wherein at least one selected from the group consisting of the metal salts of lauric acid, the metal salts of stearic acid, and the saponified montanic acid esters contains zinc.

4. The compound according to claim 1, wherein at least one selected from the group consisting of the metal salts of lauric acid, the metal salts of stearic acid, and the saponified montanic acid esters contains at least one selected from a group consisting of alkali metal elements and alkaline earth metal elements.

5. The compound according to claim 1, wherein the saponified montanic acid esters contain calcium.

6. The compound according to claim 1, wherein the saponified montanic acid esters are partially saponified montanic acid esters.

7. The compound according to claim 6, wherein a saponification value of the partially saponified montanic acid ester is 102 mgKOH/g or more and 122 mgKOH/g or less.

8. The compound according to claim 1, wherein the compound is used for transfer molding.

9. A molded article comprising:
   the compound according to claim 1.

10. A cured product of the compound according to claim 1.

11. The compound according to claim 1, wherein with respect to 100 parts by mass of the epoxy resin, a blending amount of the curing accelerator is 0.1 parts by mass or more and 30 parts by mass or less.

12. The compound according to claim 1, wherein the curing accelerator comprises at least one selected from the group consisting of 2-undecylimidazole and 2-ethyl-4-methylimidazole.

13. The compound according to claim 1, wherein with respect to 100 parts by mass of the epoxy resin, a total content of the metal salts of lauric acid, the metal salts of stearic acid, and the saponified montanic acid esters in the compound is 2 parts by mass or more and 20 parts by mass or less.

14. The compound according to claim 1, wherein the epoxy resin comprises biphenyl aralkyl type epoxy resin.

15. The compound according to claim 1, further comprising a curing agent, and the curing agent comprises phenol novolac resin.

16. A compound comprising:
   metal powder, an epoxy resin, a wax, a curing accelerator, and a stress relieving agent, wherein
   the metal powder is a soft magnetic material, a content of the metal powder is 96 mass % or more and less than 100 mass %,
   the wax contains at least one selected from a group consisting of metal salts of lauric acid, metal salts of stearic acid, and saponified montanic acid esters, and
   the stress relieving agent comprises caprolactone-modified dimethylsilicone.

17. The compound according to claim 1, being obtained by kneading the metal powder and a resin composition while heating, the resin composition comprises the epoxy resin, the wax and the curing accelerator.

18. A molded article, manufactured by transfer molding the compound according to claim 1.

19. A cured product, manufactured by transfer molding the compound according to claim 1.

* * * * *